United States Patent [19]

Hobbs et al.

[11] Patent Number: 4,459,371

[45] Date of Patent: Jul. 10, 1984

[54] FCC SULFUR OXIDE ACCEPTOR

[75] Inventors: Simon H. Hobbs, Oak Park; Edward S. Rogers, Glen Ellyn; George J. Antos, Bartlett, all of Ill.

[73] Assignee: UOP Inc., Des Plaines, Ill.

[21] Appl. No.: 548,524

[22] Filed: Nov. 3, 1983

Related U.S. Application Data

[62] Division of Ser. No. 460,433, Jan. 24, 1983.

[51] Int. Cl.³ .............................................. B01J 20/04
[52] U.S. Cl. ................................. 502/341; 512/340; 512/344; 512/414; 512/517; 423/244 R
[58] Field of Search ............... 502/340, 341, 344, 414, 502/517; 423/244 R, 244 A

[56] References Cited

U.S. PATENT DOCUMENTS

| | | | |
|---|---|---|---|
| 4,146,463 | 3/1979 | Radford et al. | 423/244 R |
| 4,153,535 | 5/1979 | Vasalos et al. | 208/120 |
| 4,259,175 | 3/1981 | McArthur | 423/244 R |
| 4,332,672 | 6/1982 | Blanton, Jr. et al. | 423/244 R |
| 4,423,019 | 12/1983 | Bertolacini et al. | 423/244 R |

*Primary Examiner*—Delbert E. Gantz
*Assistant Examiner*—Anthony McFarlane
*Attorney, Agent, or Firm*—James R. Hoatson, Jr.; Louis A. Morris; William H. Page, II

[57] ABSTRACT

An FCC sulfur oxide acceptor, its method of manufacture and use in the FCC process. The acceptor, a particulate solid containing magnesium, sodium and aluminum, the precursor of which comprises a mixture of precipitates. One precipitate is a compound of aluminum and another is a compound of magnesium. The precipitates are simultaneously precipitated from a common solution in which they have a highly limited solubility.

11 Claims, No Drawings

FCC SULFUR OXIDE ACCEPTOR

This is a division of application Ser. No. 460,433, filed Jan. 24, 1983.

BACKGROUND OF THE INVENTION

1. Field of the Invention

The field of art to which the claimed invention pertains is the catalytic cracking of hydrocarbons. More specifically, the claimed invention relates to an FCC process which circulates a sulfur oxide acceptor with the catalyst.

2. Description of the Prior Art

There are a number of continuous cyclical processes employing fluidized solid techniques in which carbonaceous materials are deposited on the solids in the reaction zone and the solids are conveyed during the course of the cycle to another zone where carbon deposits are at least partially removed by combustion in an oxygen-containing medium. The solids from the latter zone are subsequently withdrawn and reintroduced in whole or in part to the reaction zone.

One of the more important processes of this nature is the fluid catalytic cracking (FCC) process for the conversion of relatively high boiling hydrocarbons to lighter hydrocarbons boiling in the heating oil or gasoline (or lighter) range. The hydrocarbon feed is contacted in one or more reaction zones with the particulate cracking catalyst maintained in a fluidized state under conditions suitable for the conversion of hydrocarbons.

Due to the ever increasing concern about air pollution, great efforts have been expended in recent years toward the development of processes to reduce the pollutants introduced into the atmosphere from various industrial operations. One of the most onerous of these pollutants is sulfur dioxide which is present in the stacks of flue gases from various operations. In one such operation, the FCC process, sulfur compounds contained in the hydrocarbon feedstock result in sulfur containing material to be deposited on the FCC catalyst along with the carbonaceous material and thereby cause the generation of sulfur dioxide in the FCC regeneration section when the sulfur is burned off the catalyst along with the carbon deposits. The sulfur dioxide becomes a part of the regenerator flue gas and thus a pollutant when the flue gas eventually finds its way into the atmosphere.

There are many methods known to the art for removal of sulfur dioxide from stack or flue gases. There is, for example, the wet scrubbing process in which the sulfur dioxide reacts with an appropriate reactant contained in an aqueous solution or slurry sprayed into the flue gas, the sulfur thereby being removed from the system as a compound contained in the liquid phase. In another process the flue gas is passed through a fixed solid bed containing a sulfur "acceptor" with which the sulfur dioxide reacts and on which the sulfur is retained in the sulfate form, thereby being removed from the flue gas.

The basic prior art process for removal of sulfur dioxide from FCC flue gas highly pertinent to the present invention is that disclosed in U.S. Pat. No. 4,071,436 to Blanton, Jr., et al. In this process alumina or magnesia particles are in admixture with the FCC catalyst and are circulated therewith throughout the reactor-regenerator circuit. In the regenerator the alumina reacts with sulfur dioxide to form a solid compound, which when circulated to the reactor reacts with hydrocarbons in the feedstock in the reducing environment to release the sulfur. The sulfur is thereby dealt with in the FCC facilities downstream of the ractor section instead of as part of the regenerator flue gas. This reference further states that it is preferred that materials such as sodium not be present in the particulate solid used for removal of the sulfur dioxide.

U.S. Pat. No. 4,153,535 to Vasalos et al discloses the circulation of a sulfur oxide acceptor with FCC catalyst. The acceptor comprises a metallic reactant which ideally may be at least one free or combined metallic element selected from the group consisting of sodium, magnesium and copper. The metallic reactant may be supported on alumina. Suggested methods of incorporating the metallic reactant into the acceptor include impregnation of the support with a water or organic solvent-soluble or dispersible compound or compounds of the metallic reactant or incorporating the metallic reactant with a precursor such as a silica gel or silica-alumina gel.

Other references having similar teachings as the above references but not as relevant or no more relevant to the present invention are U.S. Pat. No. 4,153,534 to Vasalos; U.S. Pat. No. 4,204,945 to Flanders et al; U.S. Pat. No. 4,243,556 to Blanton, Jr; 4,252,635 to Blanton, Jr.; U.S. Pat. No. 4,300,997 to Meguerian et al, and U.S. Pat. No. 4,325,811 to Sorrentino. The last mentioned referenece also teaches the use of a reducing zone, separate from the reactor and regenerator, in which the sulfur laden acceptor is relieved of sulfur by reduction with hydrogen or a hydrocarbon gas.

The present invention is based on the discovery of a particular acceptor composition and its method of manufacture, which acceptor has unique capabilities with regard to the disposition of sulfur oxides in the regenerator flue gas.

SUMMARY OF THE INVENTION

In brief summary, the present invention is in one embodiment, a sulfur oxide acceptor comprising a particulate solid containing magnesium, sodium and aluminum, the precursor of the acceptor comprising a mixture of precipitates containing compounds of magnesium, sodium and aluminum, the precipitates having been simultaneously precipitated from a common solution in which the precipitates have a highly limited solubility.

In a second embodiment, the present invention comprises a method of manufacturing a sulfur oxide acceptor comprising sodium and magnesium ions in an alumina matrix which method compries effecting the simultaneous precipitation from a common aqueous solution of compounds of sodium, mgnesium and aluminum in which solution the precipitated compounds have a highly limited solubility.

In a third embodiment, the present invention comprises a process for fluidized catalytic cracking of a sulfur containing hydrocarbon feedstock comprising the cycling of fluidized cracking catalyst between a cracking zone, in which the catalyst is contacted at an elevated temperature with the hydrocarbon feedstock and wherein sulfur containing coke is deposited on the catalyst, and a regeneration zone, in which carbon and sulfur are oxidized and removed from the catalyst to form a flue gas containing sulfur oxides, the catalyst having physically admixed therewith a sulfur acceptor comprising a particulate solid other than the catalyst which contains magnesium, sodium and aluminum, the precursor of the acceptor comprising a mixture of precipitates containing compounds of magnesium, sodium and aluminum, the precipitates having been simultaneously precipitated from a common solution in which the precipitates have highly limited solubility, which acceptor reacts with the sulfur oxides to form spent sulfur containing acceptor, the spent acceptor being freed from the sulfur and renewed by contacting the acceptor with a reducing gas comprising hydrogen or a hydrocarbon gas at reducing conditions, whereby the sulfur becomes dissociated from the acceptor.

Other embodiments of the invention encompass details about acceptor composition, flow schemes, and acceptor reducing conditions, all of which are hereinafter disclosed in the following discussion of each of the facets of the invention.

DESCRIPTION OF THE INVENTION

Catalysts which can be used in the process of this invention include those known to the art as fluidized catalytic cracking catalysts. Specifically, the high activity aluminosilicate or zeolite-containing catalysts can be used and are preferred because of their higher resistance to the deactivating effects of high temperatures, exposure to steam, and exposure to metals contained in the feedstock. The well-known amorphous silica alumina catalyts may also be used. Other examples of catalyst which might be used, with or without zeolite are alumina, magnesia-silica, and titania-silica.

In a typical FCC process flow, finely divided regenerated catalyst leaves the regeneration zone at a certain temperature and contacts a feedstock in a lower portion of a reactor riser zone. While the resulting mixture, which has a temperature of from about 400° F. to about 1300° F., passes up through the riser, conversion of the feed to lighter products occurs and coke is deposited on the catalyst. Since the feedstock contemplated for use in the present invention may contain as high as 10 wt.% sulfur in the form of organic sulfur compounds, sulfur moieties will be deposited on the catalyst along with the coke. The effluent from the riser is discharged into a disengaging space where additional conversion can take place. The hydrocarbon vapors, containing entrained catalyst, are then passed through one or more cyclone separation means to separate any spent catalyst from the hydrocarbon vapor stream. The separated hydrocarbon vapor stream is passed into a fractionation zone known in the art as the main column wherein the hydrocarbon effluent is separated into such typical fractions as light gases and gasoline, light cycle oil, heavy cycle oil and slurry oil. Various fractions from the main column can be recycled along with the feedstock to the reactor riser. Typically, fractions such as light gases and gasoline are further separated and processed in a gas concentration process located downstream of the main column. Some of the fractions from the main column, as well as those recovered from the gas concentration process may be recovered as final product streams. The separated spent catalyst passes into the lower portion of the disengaging space and eventually leaves that zone passing through stripping means in which a stripping gas, usually steam, contact the spent catalyst purging adsorbed and interstitial hydrocarbons from the catalyst. The spent catalyst containing coke leaves the stripping zone and passes into a regeneration zone, where, in the presence of fresh regeneration gas and at a temperature of from about 1150° F. to about 1400° F., a combustion of coke produces regenerated catalyst and flue gas containing carbon monoxide, carbon dioxide, water, nitrogen and perhaps a small quantity of oxygen. Usually, the fresh regeneration gas is air, but it could be air enriched or deficient in oxygen. Flue gas is separated from entrained regenerated catalyst by cyclone separation means located within the regeneration zone and separated flue gas is passed from the regeneration zone, typically, to a carbon monoxide boiler where the chemical heat of carbon monoxide is recovered by combustion as a fuel for the production of steam, or, if carbon monoxide combustion in the regeneration zone is complete, which is the preferred mode of operation, the flue gas passes directly to sensible heat recovery means and from there to a refinery stack. Regenerated catalyst which was separated from the flue gas is returned to the lower portion of the regeneration zone which typically is maintained at a higher catalyst density. A stream of regenerated catalyst leaves the regeneration zone, and, as previously mentioned, contacts the feedstock in the reaction zone.

The sulfur problem in the FCC process is concerned primarily with the carry-over of the aforementioned sulfur moieties, into the regenerator with the coked catalyst resulting in increased emissions of sulfur oxide with the flue gas. In recent years several concepts have been proposed for reducing sulfur oxide emission from the catalyst regenerator. The most viable concept is as that disclosed as aforementioned in U.S. Pat. No. 4,071,436 and similar disclosures which involve the addition of sulfur oxide "acceptors" to the catalyst wherein the acceptor species is converted to a sulfate in the regenerator environment and subsequently converted back to an oxide form in the reactor riser or separate reduction zone with the concomitant release of sulfur in the form of hydrogen sulfide. This procedure is claimed to be reasonably effective and practical.

Additional information has been obtained which indicates that the reduction of the sulfated sulfur oxide acceptors characteristically leads not a single sulfurous species such as $H_2S$ but alarmingly to a wide spectrum of products including $H_2S$, $SO_2$, elemental sulfur, etc. Separation of a wide variety of sulfurous moieties particularly from the FCC product gas/liquid stream presents insurmountable difficulties. A partial solution is the use of an auxiliary treatment vessel upstream of the reactor riser. From such a vessel would come a concentrated stream of sulfur moieties which could be handled separately from the riser products. It is even more desirable, however, to have an acceptor which when reduced, whether the reduction occurs in the reactor riser or separate reduction zone, has a tendency to release the sulfur in the form of hydrogen sulfide.

The present invention is based on a sulfur oxide acceptor composition comprising magnesium, sodium and aluminum, with a primary requirement of the invention, in contradistinction to the teachings of U.S. Pat. No. 4,153,535, being the simultaneous precipitation of the aluminum, magnesium and sodium containing precipitates, which comprise the precursor of the acceptor, from a solution in which the precipitates have a highly limited solubility. We have found, particularly when in the finished acceptor the sodium content is from about 0.10 wt.% to about 5.0 wt.% on an elemental basis, and the magnesium content is from about 10 wt.% to about 30 wt.% on an elemental basis, with substantially all of the balance of the composition comprising an alumina matrix, that the simultaneous precipitation has a marked effect on the selectivity in the reduction of the absorbed sulfur oxide to hydrogen sulfide to the exclusion of sulfur dioxde and free sulfur. This directed reduction of sulfur oxides to hydrogen sulfide is important since contamination of hydrocarbon products with sulfur dioxide or free sulfur could have a serious detrimental effect on the products, e.g. the severe corrosion of any copper parts in the fuel feed system in an internal combustion engine which would occur from using fuel contaning a sulfur contaminated FCC product.

The essence of the method of the present invention, which comprises the simultaneous precipitation from a common solution of the magnesium, sodium and aluminum containing constituents in which solution the precipitates have a highly limited solubility, is best effected with a precipitating agent at precipitating conditions. Typically, the precipitating agent will comprise an alkaline solution with precipitation occurring at conditions including a pH in excess of 8.0 and a temperature and pressure sufficient to maintain liquid phase. The high pH is conducive to a highly limited solubility. By "highly limited solubility" we mean "insoluble" as the latter term is used in the *Handbook of Chemistry and Physics*, Chemical Rubber Publishing Co.

The common solution may be obtained by blending a first solution containing magnesium ions, e.g. a solution of $Mg(NO_3)_2$, with a second solution containing aluminum ions, e.g. a solution of $NaAlO_2$, into a third solution containing the precipitating agent, e.g. a solution of $(NH_4)_2(CO_3)$. At least one of the solutions (in this case the second must also contain the sodium ions. The simultaneous precipitation will commence almost immediately upon formation of the common aqueous solution.

A probably more desirable method of effecting precipitation in accordance with the present invention is to first blend together the first solution containing magnesium ions and the second solution containing aluminum ions, with at least one of the first and/or second solutions also containing sodium ions. The common aqueous solution is then mixed with a third solution containing the precipitating agent to effect the simultaneous precipitation. The advantage of this latter method is that the ions are in more intimate admixture in the common solution before precipitation occurs which enables a very homogeneous acceptor composition and apparent interaction between the ions themselves.

The precipitating agent in its broadest sense is simply an alkaline solution which will raise the pH of the common solution to in excess of about 8.0 and cause the precipitation of magnesium and aluminum compounds from the solution. It is preferred, however, to select a precipitating agent which will yield precipitates having the most limited water solubility possible so as to preclude significant return to solution of magnesium ions in particular. Thus, a precipitating agent comprising ammonium carbonate will cause the formation of highly insoluble magnesium and aluminum carbonates which will remain stable in an alkaline solution. Other potentially superior precipitating agents are pyrophosphates, metaborates, oxalates, or fluorides. The preferred cation of the precipitating agent is ammonium.

The precipitate may be removed from its supernatant liquor by any known means, such as decanting, after which it is dried and calcined. Drying and calcination are preferably effected by spray drying at a temperature in excess of about 1100° F. The resulting particles should be in the size range of from about 20 to about 150 microns.

The acceptor of the present invention is most preferably used with a crystalline aluminosilicate (molecular sieve) type of FCC catalyst and is most conveniently circulated with the catalyst throughout the FCC system, although it is conceivable that at some point the catalyst and acceptor would be separated for reduction of the acceptor independent of the catalyst. Reduction is effected with hydrogen or a hydrocarbon gas at reducing conditions such as a residence time of from about three seconds to about 1.0 minute, a temperature of from about 1000° F. to about 1400° F. and a pressure of from about atmospheric to about 50 psig. Reduction is most conveniently effected in the FCC reactor (riser), but, as discussed above, may be carried out in separate reduction zone.

The following non-limiting examples are presented to illustrate the manufacture and performance of the acceptor of the present invention and the superior results achieved by its use as compared to the prior art acceptors.

EXAMPLE 1

Acceptor was made in accordance with the present invention by the following formulation: 512 g $Mg(NO_3)_2 \cdot 6H_2O$ was dissolved in 2000 ml treated (deionized) water (A). 330 g $NaAlO_2$ as dissolved in 2000 ml treated water containing 30 g NaOH(B). 200 g $NH_4(NH_2CO_2)$ was dissolved in 2000 ml water (C). A and B were added to C at about 140 ml/min each, with vigorous stirring. The slurry was mixed for 5 minutes, reaching a final pH of 9.5. The pH was reduced to 7.9 by adding 210 ml HCl (11.7N). The slurry was left for 4 days to settle. Then 3000 ml of supernatant liquor was decanted off and the slurry was spray dried at 1200° F. The resulting material (D) contained 19.2% Mg., 0.24% Na, the balance alumina, and associated oxygen.

In a first test a sample of material D from above was exposed at 1346° F. to an environment comprising 15 vol.% $SO_2$, 50 vol.% $N_2$ and 35 vol.% air for 10 minutes. The material acquired a weight gain of 46%. The weight gain was construed as a capacity for the acceptor to absorb a substantial quantity of $SO_2$.

In a second test, D was fluidized at 1355° F. for 90 minutes with an artificial flue gas comprising (dry) 0.5% $SO_2$, 17% $CO_2$, 2% $O_2$, and 80.5% $N_2$. The gas had moisture content of approximately 10 mol% $H_2O$. After exposure to the flue gas. D was purged with $N_2$ for 15 minutes, and then fluidized with $H_2$ for 90 minutes at 1355° F. The sulfur product distribution for D, and that for Catapal alumina alone were:

| Distribution of sulfur product, mol % s | | |
|---|---|---|
| Acceptor | D | Catapal |
| $H_2S$ | 77 | 39 |
| $SO_2$ | 4 | 31 |
| $S_8$ | 19 | 30 |

The desired goal of producing predominantly $H_2S$ is achieved by D, as compared to the large amounts of the undesirable products $SO_2$ and $S_8$ obtained by use of alumina.

A third test was to determine the effect, if any, of the presence of the acceptor of the present invention in the FCC unit with regard to the performance of the FCC catalyst. Acceptor D was placed in physical admixture with an equilibrium commercial FCC catalyst (E) into a pilot plant scale FCC reactor. The following results were obtained.

|  | 10% D + 90% E | 100% E |
|---|---|---|
| Wt. % Conversion to 450° F.- | 78.0 | 78.7 |
| Wt. % Gasoline Yield | 62.8 | 64.1 |
| Dry Gas Yield SCFB | 53 | 69 |

It is clear that harmful effects, if any, through use of the acceptor are negligible.

EXAMPLE 2

The purpose of this example is to compare performance results of acceptors prepared by various prior art methods and the acceptor of the present invention.

Acceptor 1 and 2 were prepared by impregnation of magnesium salt onto $Al_2O_3$ particles in accordance with the teachings of aforementioned U.S. Pat. No. 4,153,535. Acceptor 2 contained a catalytically effective amount of sodium. Acceptor 3 was prepared by addition of a magnesium salt to an alumina gel, also in accordance with U.S. Pat. No. 4,153,535.

Acceptors 4, 5 and 6 were prepared by cogelation of a basic aluminum compound such as sodium aluminate with an acidic magnesium compound such as magnesium sulfate or magnesium nitrate, or by co-precipitation of a mixture of magnesium and aluminum salts with some base, such as ammonium or sodium hydroxide. The common solution from which acceptors 4, 5 and 6 were precipitated, however, were not ones in which the precipitates had highly limited solubility.

Acceptors 1–6 were subjected to an $SO_2$ acceptance test which simulated conditions in an absortion phase far more severe than a standard FCC unit. In the adsorption phase the acceptor was contacted for 90 minutes with a synthetic flue gas containing 4700 ppm S as $SO_2$ in a $CO_2$, $N_2$, $O_2$ blend, similar to (but much higher in $SO_2$) standard FCC regenerator composition (after CO burning). In contrast, the FCC regenerator residence time is only 5 minutes or less with about 500 ppm S as $SO_2$.

The acceptor was then subjected to a reduction test, but one which was much less severe than an FCC unit reactor section. The acceptor was more highly charged with $SO_2$ than it would have been in an FCC unit. In our test the reduction continued for 90 minutes at 1355° F. while in the FCC reactor or in a stripper vessel between regenerator and reactor, the residence time would be only a few seconds, certainly not longer than one minute. If complete reduction did not occur in our test, it would certainly not have occurred in a commercial system.

The summary of the results for acceptors 1–6 is as shown in Table 1.

Five acceptors (7 through 11) were then prepared in accordance with the present invention. All were prepared with a carbonate additive in the common solution to effect precipitation of aluminum and magnesium carbonates. Upon spray drying at elevated temperature the carbonates were readily decomposed (liberating $CO_2$) so that no carbonate remained in the finished acceptor. Tests were carried out in a manner similar to the above tests for acceptors 1–6. The results are shown in Table 2.

A comparison of the data of Tables 1 and 2 vividly illustrates the surprising and unexpected selectivity to $H_2S$ achieved by the present invention, i.e. as high as 92% as compared to 72% by the best of the prior art acceptors. The relatively how selectivity of acceptor 11 is probably due to the low pH of the gel (precipitate slurry) which was only 7.1 as compared to the preferred in excess of 8.0.

TABLE 1

| Catalyst Preparations by Techniques Familiar in the Art | | | | | | |
|---|---|---|---|---|---|---|
| Catalyst # | 1 | 2 | 3 | 4 | 5 | 6 |
| Analysis | | | | | | |
| % Mg | 17.6 | 17.6 | 16.8 | 20.0 | 17.6 | 17.7 |
| % Na | 0.1 | 1.0 | 1.0 | 0.03 | 1.5 | 0.23 |
| $Al_2O_3$ | Bal. | Bal. | Bal. | Bal. | Bal. | Bal. |
| Sulfur Accepting and Reduction | | | | | | |
| % Acceptance | 73 | 92 | 73 | 81 | 95 | 100 |
| Reduction: | | | | | | |
| % as $H_2S$ | 47 | 32 | 66 | 44 | 72 | 54 |
| % as $S_8$ | 32 | 55 | 24 | 39 | 23 | 27 |
| % as $SO_2$ | 27 | 13 | 10 | 17 | 5 | 18 |

TABLE 2

| Catalysts of This Invention | | | | | |
|---|---|---|---|---|---|
| Catalyst # | 7 | 8 | 9 | 10 | 11 |
| pH of Gel. | 7.6 | 7.9 | 8.0 | 8.5 | 7.1 |
| Catalyst Analysis | | | | | |
| % Na | 1.0 | 0.24 | 1.5 | 1.0 | 1.0 |
| % Mg | 15.0 | 17.6 | 16.9 | 16.7 | 15.1 |
| % $Al_2O_3$ | Bal. | Bal. | Bal. | Bal. | Bal. |
| Sulfur Acceptance & Reduction | | | | | |
| % Acceptance | 87 | 70 | 100 | 91 | 100 |
| Reduction: | | | | | |
| % as $H_2S$ | 70 | 77 | 92 | 90 | 63 |
| % as $S_8$ | 23 | 19 | 7 | 9 | 37 |
| % as $SO_2$ | 7 | 4 | 1 | 1 | 0 |

We claim as our invention:

1. A sulfur oxide acceptor comprising a particulate solid containing magnesium, sodium and aluminum, said acceptor comprising 0.10 wt % to about 5.0 wt % sodium on an elemental basis, 10 wt % to about 30 wt % magnesium on an elemental basis, the precursor of said acceptor comprising a mixture of precipitates comprising compounds of magnesium and aluminum, which contain compounds of sodium, said precipitates having been simultaneously precipitated at a pH of about 8.0 or above from a common solution comprising magnesium, aluminum and sodium, in which said precipitates have a highly limited solubility.

2. The acceptor of claim 1 wherein said acceptor comprises the oxides of sodium and magnesium in an alumina matrix.

3. The acceptor of claim 2 wherein said acceptor comprises particles in the size range of from about 20 to about 150 microns.

4. A method of manufacturing a sulfur oxide acceptor comprising sodium and magnesium ions in a alumina matrix, said acceptor comprising 0.10 wt % to about 5.0 wt % sodium, on an elemental basis, 10 wt % to about 30 wt % magnesium on an elemental basis, substantially all of the balance of the composition comrising alumina, which method comprises effecting the simultaneous precipitation with a precipitating agent at a pH of about 8.0 or above from a common aqueous solution comprising magnesium aluminum and sodium compounds of magnesium and aluminum which contain compounds of sodium in which solution the precipitated compounds have a highly limited solubility.

5. The method of claim 4 wherein said common aqueous solution is obtained by blending a first solution containing magnesium ions and a second solution containing aluminum ions, at least one of said first and second solutions also containing sodium ions, into a third solution containing said precipitating agent, whereby said simultaneous precipitation commences upon formation of said common aqueous solution.

6. A method of claim 4 wherein said common aqueous solution is obtained by blending together a first solution containing magnesium ions and a second solution containing aluminum ions, at least one of said first and second solutions, also containing sodium ions, said common aqueous solution then being mixed with a third solution containing said precipitating agent, thereby effecting said simultaneous precipitation.

7. The method of claim 4 wherein said precipitating agent is alkaline and said precipitating conditions include a pH in excess of 8.0 and a temperature and pressure sufficient to maintain liquid phase.

8. The method of claim 7 wherein said precipitating agent comprises a carbonate, a pyrophosphate, a metaborate, an oxalate, or a fluoride.

9. The method of claim 8 wherein the cation of said precipitating agent comprises ammonium.

10. The method of claim 4 wherein the precipitate is removed from its supernatant liquor, dried and calcined.

11. The method of claim 10 wherein drying and calcination is effected by spray drying the precipitate at a temperature in excess of about 1100° F.

* * * * *